United States Patent [19]

Clemmons

[11] 3,991,860
[45] Nov. 16, 1976

[54] MEANS ENABLING REPLACEMENT OF WORN DISC BRAKE SHOES WITHOUT DISASSEMBLY

[75] Inventor: Quentin T. Clemmons, Chula Vista, Calif.

[73] Assignee: Westinghouse Air Brake Company, Wilmerding, Pa.

[22] Filed: Apr. 24, 1975

[21] Appl. No.: 571,389

[52] U.S. Cl. ............................... 188/73.6; 188/59; 188/245
[51] Int. Cl.² ...................................... F16D 69/04
[58] Field of Search ............ 188/58, 59, 71.5, 73.6, 188/153 R, 206 R, 242, 245; 192/70.13

[56] References Cited
UNITED STATES PATENTS

| | | | |
|---|---|---|---|
| 1,034,694 | 8/1912 | Crittenden | 192/70.13 |
| 2,204,807 | 6/1940 | McCune et al. | 188/153 R |
| 2,416,871 | 3/1947 | Gaenssle | 188/59 X |

Primary Examiner—Duane A. Reger
Attorney, Agent, or Firm—W. F. Poore; R. W. McIntire, Jr.

[57] ABSTRACT

This invention relates to a disc brake apparatus wherein a plurality of brake shoes, that transmit braking force to a plurality of rotating discs, when worn to their minimum allowable thickness, may be replaced with new brake shoes, without disassembly of the disc brake apparatus, by unlocking, rotating through an angle of one hundred and eighty degrees, and thereafter relocking a plurality of pivotally mounted arms each of which may have attached to and detached from its respective ends a worn brake shoe and a new brake shoe, the rotation of each arm moving a new brake shoe to the position formerly occupied by a worn brake shoe thereby enabling the new brake shoe to transmit a braking force to the rotating disc formerly braked by the worn brake shoe.

17 Claims, 2 Drawing Figures

MEANS ENABLING REPLACEMENT OF WORN DISC BRAKE SHOES WITHOUT DISASSEMBLY

BACKGROUND OF THE INVENTION

In most heretofore known disc brake apparatus comprising a plurality of non-rotating brake shoes that are movable into braking engagement with a corresponding number of rotating brake disc, it is necessary, when replacing a worn brake shoe or shoes with a new shoe or shoes, to remove and then replace one or more bolts, nuts, pins, etc. This work is time consuming and therefore, expensive.

Accordingly, it is the general purpose of this invention to provide a disc brake apparatus with a novel manually operable means for replacing worn brake shoes with new brake shoes without disassembly of the brake apparatus.

SUMMARY OF THE INVENTION

According to the present invention, there is provided in a pneumatically operated disc brake apparatus, having a plurality of non-rotatable brake shoes movable into braking engagement with a corresponding number of rotating discs, a plurality of releasably lockable arms, one for each brake shoe, each arm being pivotally mounted midway its length on a common fulcrum. Each end of each arm is provided with a tenon onto which may be tightly fitted a mortise that is formed in a lug that is integral with the backing plate of a brake shoe.

The brake shoes for braking the rotating discs are thus detachable carried at one end of the plurality of arms which one end normally occupies such a position as to enable the brake shoe carried thereon to be moved into braking engagement with a corresponding disc. When the thickness of any brake shoe is reduced by wear to the minimum allowable thickness, the mortise in the lug that is integral with the backing plate of a new brake shoe is fitted onto the tenon at the other end of the arm detachable carrying the worn brake shoe. The arm is then unlocked, rotated through an angle of one hundred and eighty degrees and then relocked. Thus, the new brake shoe is moved into the position formerly occupied by the worn brake shoe in which position the new brake shoe may be moved into braking engagement with the corresponding disc when a brake application is subsequently effected.

Following rotation of the arm through an angle of one hundred and eighty degrees, the worn brake shoe is detached therefrom and discarded.

DESCRIPTION

Figure 1:
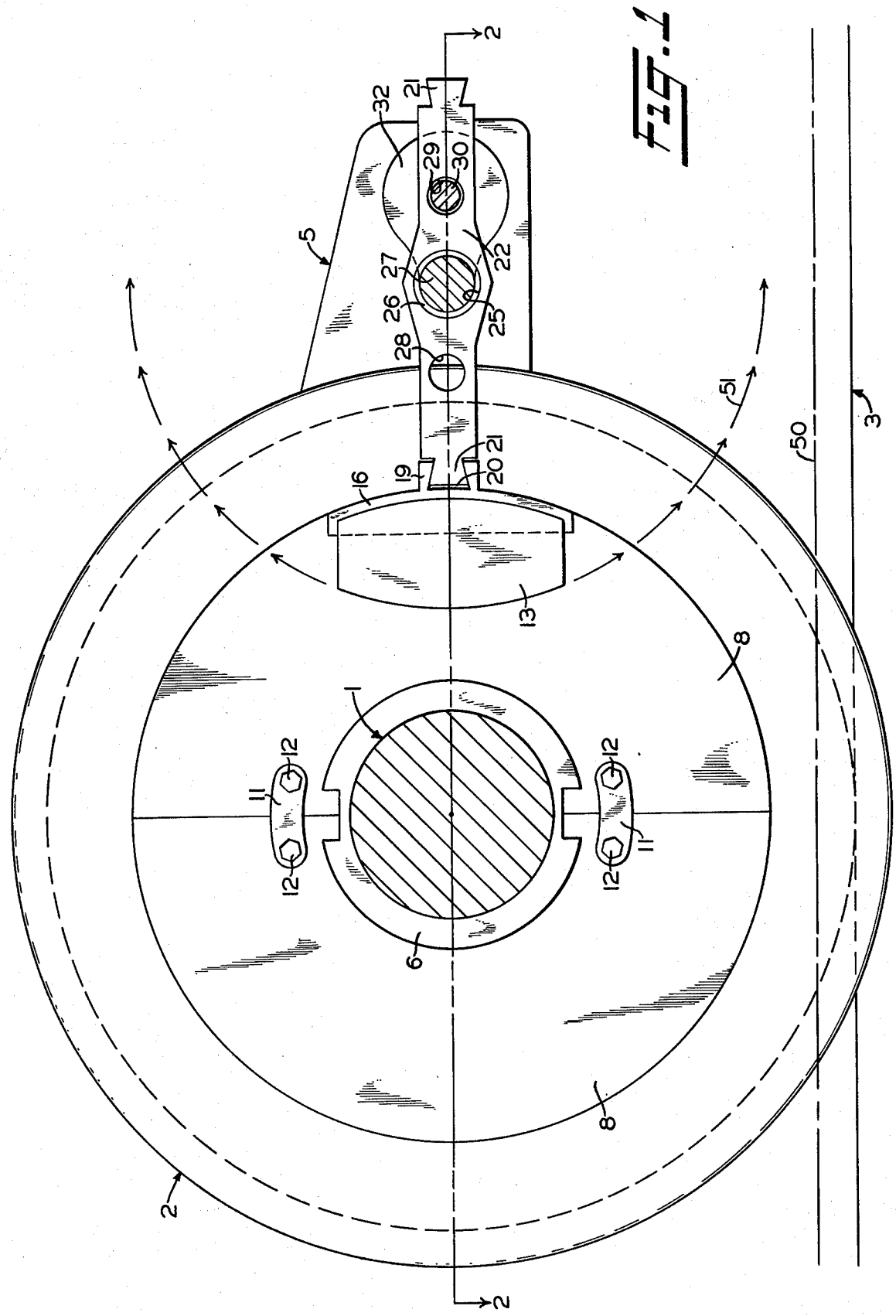
FIG. 1 is a vertical sectional view taken along the line 1—1 of FIG. 2, showing a disc brake apparatus for a rotating element to be braked.
Figure 2:
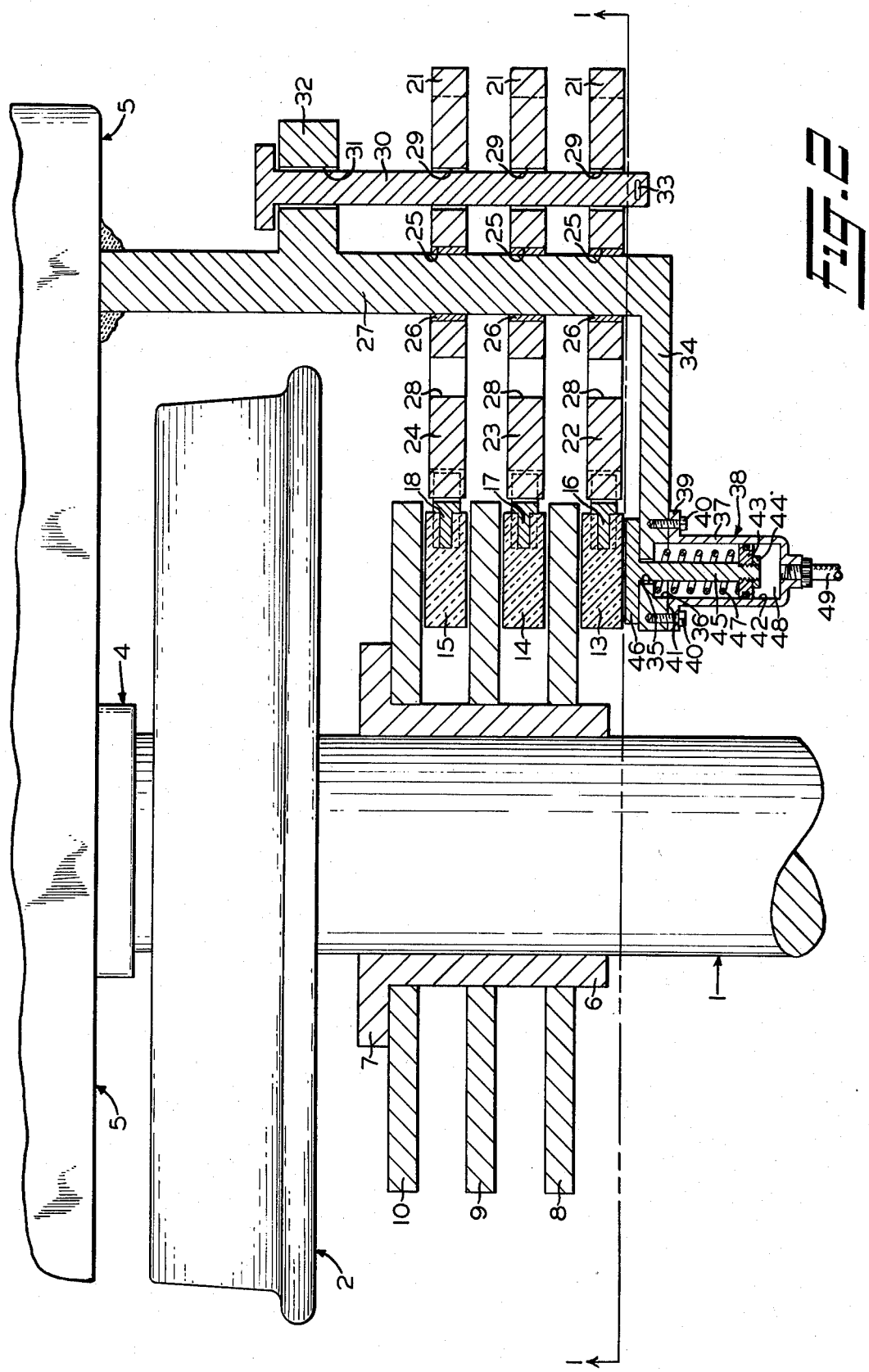
FIG. 2 is a horizontal sectinal view, taken along the line 2—2 of FIG. 1, showing certain structural details not made apparent in FIG. 1.

As shown in FIGS. 1 and 2 of the drawings, the disc brake apparatus constituting the present invention is associated, for the purpose of illustration, with an assembly of an axle 1 and a pair of wheels 2 secured to the opposite ends thereof, only one of these wheels 2 being shown in the drawings, for rolling on a track rail indicated in FIG. 1 by the reference numeral 3. A journal box 4 which constitutes a part of a side frame member 5 is mounted on the axle 1 outboard of each wheel 2.

Only one end of the axle 1 is shown in the drawings since the disc brake apparatus embodying the invention and adapted to be applied to the wheel and axle assemblage adjacent both ends thereof inboard of the wheels are of identical construction, and the showing of one is deemed adequate to a comprehensive understanding of the invention.

Pressed onto the axle 1 adjacent the wheel 2 is a splined hub 6 that has a collar 7 formed integral therewith at the end thereof adjacent the wheel 2.

Any chosen number of rotatable split splined friction braking elements may be slidably mounted on the splined hub 6, three such braking elements being shown in FIG. 2 and denoted by the reference numerals 8, 9 and 10. Only the braking element 8 appears in FIG. 1 of the drawings and, as shown therein, the two halves comprising this braking element 8 are connected together by two arcuate links 11, each of which is provided with a pair of spaced-apart smooth bores (not shown) through which extend a pair of cap screws 12 that have screw-threaded engagment with screw-threaded bores (not shown) provided therefor in the two semi-circular halves of this braking element 8. It should be understood that the two semi-circular halves of each of the split splined braking elements 9 and 10 are connected together by a pair of arcuate links and four cap screws in the same manner as described above for the braking element 8.

As shown in FIG. 2, interleaved between the rotatable friction braking elements 8, 9 and 10 are three brake shoes 13, 14 and 15 which may be made of any desirable material but preferably of some composition friction material such as, for example, that described and claimed in U.S. Pat. No. 2,686,140, issued Aug. 10, 1954, to Charles L. E. de Gaugue, and assigned to Johns-Manville Corporation, New York, New York.

Each of the brake shoes 13, 14 and 15 comprises a molded composition brake block of the shape shown in FIG. 1 for the shoe 13. The composition brake blocks of the three brake shoes 13, 14 and 15 are respectively molded integral with three metal backing plates 16, 17 and 18, only the backing plate 16 appearing in FIG. 1 of the drawings.

As shown in FIG. 1, the backing plate 16 has formed integral therewith on the side opposite the brake shoe 13 a lug 19 having a mortise 20 therein that makes an interlocking joint with one of a pair of tenons 21 formed on the respective opposite ends of a brake arm 22.

It should be understood that the backing plates 17 and 18 are each provided with a lug having a mortise therein to enable the respective mortise to make an interlocking joint with either one of a pair of tenons formed on the respective opposite ends of a pair of brake arms 23 and 24 that appear in FIG. 2.

Moreover, it should be understood that the size of the mortises and tenons are such as to provide such as, for example, a free fit therebetween, thereby enabling a workman to easily attach and subsequently detach from either end of a brake arm a brake shoe and its backing plate by, for example, the application of a series of manually applied hammer blows.

Midway their length, each of the brake arms 22, 23 and 24 is provided with a bore 25 into which is pressed a removable wear bushing 26 through which bushings extends with a running fit therebetween a fulcrum pin or shaft 27 the upper end of which is secured by any suitable means, such as, for example, welding, to the side frame member 5.

At equal distances from the center of the bore 25 therein, each of the brake arms 22, 23 and 24 is provided with bores 28 and 29 that may have the same diameter.

The brake arms 22, 23 and 24 are retained in the position shown in FIG. 2, by means of a removable headed pin 30 that has a diameter less than that of the bores 28 and 29 and extends through a bore 31 in a first arm 32 that is formed integral with the shaft 27 and also the bore 29 in each of the brake arms 22, 23 and 24. The lower end of this pin 30, as viewed in FIG. 2, is provided with a bore for receiving therein a cotter pin 33 which prevents loss of the pin 30 as by vibration. This pin 30 serves to prevent rotary movement of the arms 22, 23 and 24 when a brake application is effected by means now to be described.

As shown in FIG. 2, the shaft 27 at its lower end has formed integral therewith a second arm 34 that extends in the direction opposite that of the first arm 32. Adjacent its outer or left-hand end, the arm 34 is provided with a bore 35 and a coaxial counterbore 36 to thereby enable this portion of the arm 34 to constitute a non-pressure head for a cup-shaped body 37 of a brake cylinder device 38.

The open end of the cup-shaped body 37 has an outturned flange 39 that is provided with a plurality of arcuately-spaced smooth bores through each of which extends a cap screw 40 the screw threads of which have screw-threaded engagement with internal screw threads formed in a coaxial bottomed bore in the second arm 34. These cap screws 40, only two of which appear in FIG. 2 of the drawings, serve to secure the outturned flange 39 of the brake cylinder body 37 to a flat bolting face 41 formed on the lower side of the second arm 34 adjacent its left-hand end, as viewed in FIG. 2.

Slidably mounted in a bottomed bore 42 provided therefor in the body 37 is a piston 43 that is secured by a nut 44 to the threaded end of a piston rod 45 that extends through the bore 35 in arm 34 and has formed integral therewith at its upper end, as viewed in FIG. 2, a disc member 46 that is an alignment with the brake shoes 13, 14 and 15.

Disposed in surrounding relation to the piston rod 45 and interposed between the piston 43 and the end of the counterbore 36 is a spring 47 for normally biasing the disc member 46 into abutting relationship with the arm 34.

The piston 43 cooperates with the wall surface of the bottomed bore 43 in the body 37 to form a pressure chamber 48. Fluid under pressure may be supplied to the chamber 48 via a pipe 49 that is connected to such as the brake cylinder port of the usual brake control valve device (not shown) of the usual air brake equipment on railway vehicles under the control of the locomotive engineer.

OPERATION

If a vehicle provided with the axle 1 having wheels 2 at the opposite ends thereof and for each wheel the disc brake apparatus constituting the present invention is rolling along a pair of rails 3 and it is desired to effect a brake application, fluid under pressure is supplied to each chamber 48 (FIG. 2) through the corresponding pipe 49 in response to operation of the brake control valve device on the vehicle.

The fluid under pressure supplied to the chamber 48 (FIG. 2) acts on the piston 43 to effect movement thereof upward or in the direction of the wheel 2 shown in FIG. 2. As the piston 43 is thus moved upward, it acts through the piston rod 45 to move the disc member 46 upward and into abutting relation with the brake shoe 13.

As the piston 43, rod 45 and disc member 46 continue to be moved upward by the fluid under pressure supplied to the chamber 48, this movement is effective to cause the brake shoe 13 and brake arm 22 to move upward as the bushing 26 in this brake arm 22 slides or shifts along on the shaft 27 and pin 30 until the brake shoe 13 is pressed into braking engagement with the rotating braking element 8. This brake element 8 is then picked up and shifted relative to the splined hub 6 into engagement with the non-rotatable brake shoe 14. Thereafter this shoe 14 and brake arm 23 on which it is carried are next shifted along on the shaft 27 and pin 30 until this shoe 14 is pressed into braking engagement with the rotating braking element 9 which is then picked up and shifted or slid along on the hub 6 into engagement with the non-rotatable brake shoe 15.

The continued shifting of the brake shoes 13 and 14 and braking elements 8 and 9 by the fluid under pressure acting on the piston 43 will now cause the brake shoe 15 and brake arm 24 on which it is carried to be shifted along on the shaft 27 and pin 30 until this shoe 15 is pressed into braking engagement with the rotating braking element 10 which, as shown in FIG. 2, abuts the collar 7 that is integral with the hub 6.

After the several non-rotatable brake shoes 13, 14 and 15 and rotatable braking elements 8, 9 and 10 are thus all moved into frictional interengagement, the fluid under pressure supplied to the pressure chamber 48 to act on the piston 43 in the brake cylinder 38 forces these shoes and elements together with pressure, whereupon the non-rotatable brake shoes 13, 14 and 15, which are held against rotation by the pin 30 extending through corresponding brake arms 22, 23 and 24, create a drag upon the rotating braking elements 8, 9 and 10 which is transmitted through the splined hub 6 and axle 1 to the wheels 2 carried on axle 1 to effect braking on these wheels. The thrust of the brake cylinder piston 43 against the braking elements 8, 9 and 10 is taken through the collar 7 provided on the splined hub 6 which is pressed onto the axle 1, as will be evident.

The degree with which the rotatable braking elements 8, 9 and 10 and thereby the wheels 2 are braked, as just described, depends upon the pressure of the fluid supplied to pressure chamber 48 to act on the brake cylinder piston 43 in the brake cylinder 38 and may be varied in any desired well-known manner to provide any chosen degree of braking.

As the braking elements 8, 9 and 10 and brake shoes 13, 14 and 15 are moved together in effecting a brake application of the brakes, the release spring 47 will be compressed, as will be evident.

In order to effect a release of the brakes after an application, the fluid under pressure is released from the pressure chamber 48, whereupon the release spring 47 acts to move the piston 43, piston rod 45 and disc member 46 downward, as viewed in FIG. 2, to their release position which is defined by the disc member 46 abutting the arm 34, as shown. During this movement the force pressing together the several braking elements 8, 9 and 10 and brake shoes 13, 14 and 15 is released therefrom thereby releasing the brake application.

REPLACEMENT OF WORN BRAKE SHOES

It will be noted from FIG. 2 of the drawings that the thickness of the brake shoes 13, 14 and 15 is greater than the thickness of their corresponding backing plates 16, 17 and 18. It will be understood that when wear of the brake shoes 13, 14 and 15 has reduced their thickness to a chosen minimum value which is in excess of the thickness of their corresponding backing plates 16, 17 and 18, these shoes must be replaced with new brake shoes. Go and no go gages may be used to determine when the minumum allowable thickness of the brake shoes 13, 14 and 15 is reached.

Since the procedure for replacing each worn brake shoe with a new brake shoe is the same, a description of the procedure for replacing one of the shoes 13, 14 and 15, when worn to its minimum allowable thickness, with a new brake shoe will suffice for all.

Let it be assumed that the brake shoe 13 is worn to its minimum allowable thickness and is to be replaced with a new brake shoe.

It will be assumed that the brakes are released and the chamber 48 is void of fluid under pressure. Therefore, the disc member 46 is biased by the spring 47 into abutting relationship with the arm 34 and, accordingly, out of contact with the worn brake shoe 13 that is carried on the left-hand end, as viewed in FIG. 2, of the brake arm 22.

Now, to replace the worn brake shoe 13 with a new brake shoe, first, the mortise 20 in the lug 19 that is integral with the backing plate of the new brake shoe is placed in alignment with the tenon 21 at the right-hand end, as viewed in FIG. 2, of the brake arm 22.

Next, by the manual application of a series of successive hammer blows to lug 19, this lug 19 is driven onto the tenon 21 at the right-hand end of the brake arm 22, it being remembered, as hereinbefore-stated, the sizes of the tenon 21 and the mortise 20 in the lug 19 are such as to provide a free fit therebetween.

After the new brake shoe has been properly positioned with respect to the brake arm 22 so that the upper side or braking surface of the new shoe is above the upper side of the brake arm 22 and the lower side or braking surface of this new brake shoe is below the lower side of the brake arm 22, it being understood that the thickness of the new shoe is somewhat greater than the thickness of the brake arm 22, the cotter pin 33 is removed from the headed pin 30.

Thereafter, the headed pin 30 is withdrawn from the bore 29 in the brake arm 22. It will be understood that, if two or all three brake shoes are worn to their minimum allowable thickness and are to be replaced with new brake shoes, the headed pin 30 will be withdrawn from the bore 29 in the corresponding brake arm of each worn brake shoe.

Subsequent to withdrawing the headed pin 30 from the bore 29 in the brake arm 22, or from all brake arms carrying worn brake shoes that are to be replaced with new brake shoes, the brake arm 22, and any other brake arm carrying at its left-hand end, as viewed in FIG. 2, a worn brake shoe and at its right-hand end a new brake shoe, will be manually rotated about the shaft 27 through an angle of one hundred and eighty degrees. This rotation of the brake arm 22 will move the new brake shoe to the position in which the brake shoe 13 is shown in FIG. 2.

Moreover, when the brake arm 22 has been rotated through an angle of one hundred and eight degrees, the brake shoe 13, worn to its minimum allowable thickness, will be carried at the right-hand end, as viewed in FIG. 2, of this brake arm 22.

After the brake arm 22 has been rotated through an angle of one hundred and eighty degrees, the headed pin 30 is pushed through the bore 28 in this brake arm 22, it being understood that this bore 28 now occupies the position in which the bore 29 is shown in FIG. 2.

Following pushing the pin 30 through the bore 28 in the brake arm 22, the cotter pin 33 is replaced in this pin 30.

The brake shoe 13, worn to its minimum allowable thickness and now carried at the right-hand end, as viewed in FIG. 2, of the brake arm 22, may be detached from this brake arm by manual application of a series of successive hammer blows to the lug 19 to force it off this brake arm, or, in other words, to cause the tenon 21 at the right-hand end of this brake arm 22 to be withdrawn from the mortise in the lug 19.

After the replacement of one or more worn brake shoes with new brake shoes in the manner described above, a brake application may be effected by supplying fluid under pressure to the chamber 48 whereupon the non-rotatable brake shoes 13, 14 and 15 are forced into braking engagement with the rotatable braking elements 8, 9 and 10, as hereinbefore described.

Referring to FIG. 1 of the drawings, the distance between the center of the axle 1 and a line denoted by the reference numeral 50 denotes the minimum allowable radius of the wheel 2, or the distance from the center of the axle 1 to the top of the rail 3 when the tread surface of the wheel 2 has been worn away by use the maximum amount allowable before the wheel 2 must be replaced with a new wheel.

Furthermore, an arc shown in FIG. 2 and denoted by the reference numeral 51 denotes the path of the outside edge of the brake shoe 13 when the brake lever 22 is rotated through an angle of one hundred and eighty degrees. Accordingly, it is apparent from FIG. 1 that when a brake shoe worn to the minimum allowable thickness is to be replaced by a new shoe on a vehicle having a wheel 2 the tread surface of which has been worn away by use the maximum amount allowable, the rotation of the brake arm 22 and brake shoe 13 through an angle of one hundred and eighty degrees can be accomplished without the brake shoe 13 striking the roadway or the railway ties extending between a pair of rails 3.

Having now described the invention, what I claim as new and desire to secure by Letters Patent, is:

1. A brake apparatus for a wheel and axle assembly of a vehicle, said apparatus comprising:
   a. at least one annular braking element disposed in coaxial non-rotatable and slidable relation with respect to the wheel and axle assembly to simultaneously rotate therewith,
   b. at least one braking means movable into braking engagement with said at least one annular braking element,
   c. at least one arm member to and from each end of which said at least one braking means may be respectively attached and detached, said arm member being provided with a first opening and a second opening each equidistant from a third opening midway its length,
d. a fulcrum member so extending through said third opening in said at least one arm member as to enable said at least one arm member to be slidably mounted on and rotatable about said fulcrum member through an angle of at least one hundred and eighty degrees to enable detaching a worn braking means from one end of said at least one arm member subsequent to attaching a new braking means to the other end prior to said rotation,
e. releasable locking means for selective insertion in said first and second openings to releasably lock said at least one arm member in a first position and in a second position, and
f. power means operative to effect movement of said at least one arm member relative to said fulcrum member and said releasable locking means to cause said at least one braking means, while attached to one end of said at least one arm member, to be moved into braking engagement with said at least one braking element.

2. A brake apparatus for a wheel and axle assembly of a vehicle, as recited in claim 1, further characterized by splined means connecting said at least one annular braking element to the wheel and axle assembly.

3. A brake apparatus for a wheel and axle assembly of a vehicle, as recited in claim 1, further characterized in that said at least one annular braking element comprises:
a. a first semi-circular braking element,
b. a second semi-circular braking element, and
c. means so securing said first and second semi-circular braking elements each to the other so as to enable said first and second semi-circular braking elements to constitute said at least one annular braking element.

4. A brake apparatus for a wheel and axle assembly of a vehicle, as recited in claim 1, further characterized in that said at least one braking means is provided with a mortise, and each end of said at least one arm member is provided with tenon for disposition in said mortise whereby said mortise and said tenon enable said one braking element to be attached to and subsequently detached from either end of said at least one arm member.

5. A brake apparatus for a wheel and axle assembly of a vehicle, as recited in claim 1, further characterized in that said at least one braking means comprises:
a. a backing plate having a pair of parallel spaced-apart edges and a pair of faces one of which has formed integral therewith a lug provided with a mortise therein, and
b. a brake block of friction material molded to the other face of said backing plate and having a pair of parallel spaced-apart braking surfaces, the thickness of said brake block exceeding the width of said backing plate whereby each of said braking surfaces lies in a plane parallel to and spaced-apart outboard of one of said pair of parallel spaced-apart edges of said backing plate, and said at least one arm member has a tenon formed on each end thereof, the size of each tenon being such as to provide a free fit with said mortise provided in said lug thereby enabling said braking means to be attached to and detached from said lug by manual application of a series of successive hammer blows to said braking means.

6. A brake apparatus for a wheel and axle assembly of a vehicle, as recited in claim 1, further characterized in that said third opening in said at least one arm member is provided with a removable wear means.

7. A brake apparatus for a wheel and axle assembly of a vehicle, as recited in claim 1, further characterized in that said fulcrum member is anchored to the vehicle and is provided with means for supporting thereon said releasable locking means.

8. A brake apparatus for a wheel and axle assembly of a vehicle, as recited in claim 1, further characterized in that said fulcrum member is anchored to the vehicle and is provided with an arm having an opening therein through which said releasable locking means extends whereby said locking means is rendered effective to lock said at least one arm member against rotation about said fulcrum member.

9. A brake apparatus for a wheel and axle assembly of a vehicle, as recited in claim 1, further characterized in that said releasable locking means comprises:
a. a headed pin provided with a bore, and
b. a cotter pin removably disposed in said bore in said headed pin.

10. A brake apparatus for a wheel and axle assembly, as claimed in claim 3, further characterized in that each of said first and second semi-circular braking elements is provided with a pair of substantially diametrically arranged screw-threaded bores, and said securing means comprises:
a. a pair of arcuate link members each provided with a pair of arcuately spaced-apart smooth bores, and
b. two pairs of cap screws, each cap screw of each pair extending through a smooth bore in one of said link members and having screw-threaded engagement with one of said pair of screw-threaded bores in one of said semi-circular braking elements whereby each semi-circular braking element is detachably connected in abutting relation to the other semi-circular braking element to form said at least one annular braking element.

11. The method of replacing a worn braking element detachable from one end of a releasable locked arm member rotatable about a fulcrum means when unlocked, comprising the steps of:
a. first, removably attaching a new braking element to the other end of said arm member,
b. next, effecting the unlocking of said releasable locked arm member,
c. thereafter, rotating said unlocked brake element-carrying arm member about said fulcrum means through an angle of substantially one hundred and eighty degrees to move said new braking element to the position formerly occupied by said worn braking element, and
d. then effecting the relocking of said arm member.

12. The method of replacing a worn braking element having a mortise detachable from a tenon on the end of a releasable locked arm member rotatable about a fixed fulcrum means comprising the steps of:
a. first forcing the mortise of a new braking element over the tenon at the other end of said arm member,
b. next, effecting the unlocking of said releasable locked arm member,
c. thereafter, rotating said unlocked brake-element-carrying arm member about said fixed fulcrum through an angle of substantially one hundred and eighty degrees to move said new braking element to the position formerly occupied by said worn braking element, d. then effecting the relocking of said arm member, and e. thereafter, forcing the mortise of said worn braking element off the tenon at the one end of said arm member.

13. A brake apparatus for a wheel and axle assembly of a vehicle, said apparatus comprising:

a. a plurality of annular braking elements disposed in spaced-apart parallel relation one with the other, each element being coaxial with and slidable on the axle of the wheel and axle assembly for simultaneous rotation therewith, b. a plurality of braking means interleaved between said plurality of annular braking elements and movable into braking contact therewith to transmit a retarding force thereto, c. a plurality of arm members to and from each and of each of which one of said plurality of braking means may be respectively attached and subsequently detached, each of said plurality of arm members being provided with a first opening and a second opening each equidistant from a third opening midway the length thereof, d. a fulcrum member fixed at one end and so extending through said third opening in each of said plurality of arm members so as to enable each of said arm members to be slidably mounted on and rotatable about said fixed fulcrum member, independently of the other arm members, from a first position through an angle of substantially one hundred and eighty degrees to a second position to enable a new braking means to be attached to one end of any arm member prior to its rotation through an angle of one hundred and eighty degrees and a worn braking means to be detached from the other end of said any arm member subsequent to said rotation, e. releasable locking means for selective successive insertion in said first and second openings in each of said plurality of arm members to releasably lock said arm members in said first position and in said second position, and f. power means operative to effect successive shifting of said plurality of arm members relative to said fixed fulcrum member and said releasable locking means to cause said plurality of nonrotating braking means, while attached to one end of said plurality of arm members, to be successively shifted into braking engagement with an adjacent braking element until each of said nonrotating braking means transmits a retarding force to the next adjacent rotating braking element while in braking contact therewith.

14. A brake aparatus for a wheel and axle assembly, as recited in claim 13, further characterized by a splined means connecting each of said annular braking elements to the axle of said wheel and axle assembly.

15. A brake apparatus for a wheel and axle assembly, as recited in claim 13, further characterized in that each of said annular braking elements comprises:

a. two identical semi-circular braking elements, and b. means so connecting said two identical semi-circular elements as to form said annular braking element.

16. A brake apparatus for a wheel and axle assembly of a vehicle, as recited in claim 13, further characterized in that each of said plurality of braking means is provided with a mortise, and each end of each of said plurality of arm members is provided with a tenon for receiving thereon the mortise of one of said plurality of braking means whereby each mortise and cooperating tenon enable the corresponding braking means to be attached to and subsequently detached from one end of one of said plurality of arm members.

17. A brake apparatus for a wheel and axle assembly of a vehicle, said apparatus comprising:

a. a brake element disposed in coaxial non-rotatable relation with respect to the wheel and axle assembly to simultaneously rotate therewith, b. braking means movable into braking engagement with said braking element, c. an arm member to and from one end of which said braking means may be attached and detached, said arm member being provided with a first opening and a second opening, d. a fulcrum member so extending through said first opening in said arm member as to enable said arm member to be slidably mounted on and rockable about said fulcrum member out of a first position through a chosen angle to a second position to enable detaching a worn braking means from said one end of said arm member and subsequently attaching to a new braking means to said one end, and rocking said arm member to its said first position, e. a releasable locking means for insertion into said second opening in said arm member to releasably lock said arm member in said first position in which said braking means is movable into braking engagement with said braking element, and f. power means operative to effect movement of said arm member relative to said fulcrum member and said releasable locking means to cause said braking means, while attached to said one end of said arm member, to be moved into braking engagement with said braking element.

* * * * *

UNITED STATES PATENT AND TRADEMARK OFFICE
CERTIFICATE OF CORRECTION

PATENT NO. : 3,991,860
DATED : November 16, 1976
INVENTOR(S) : Quentin T. Clemmons It is certified that error appears in the above-identified patent and that said Letters Patent are hereby corrected as shown below:

Column 9, line 15, "pluraity" should be --plurality-- line 19, delete "and", second occurrence, to read -- end --.

line 28, delete "so"

Column 10, line 1, "aparatus" should be --apparatus-- line 44, delete "a"

Signed and Sealed this

Seventeenth Day of May 1977

[SEAL]

*Attest:*

RUTH C. MASON
*Attesting Officer*

C. MARSHALL DANN
*Commissioner of Patents and Trademarks*